United States Patent [19]

Symonds

[11] Patent Number: 4,974,681
[45] Date of Patent: Dec. 4, 1990

[54] METHOD FOR FRACTURING SUB-SURFACE HARDPAN BY DRAWING A PARTICULARLY-ANGLED TINE THERETHROUGH

[76] Inventor: Darrell C. Symonds, 13 Linkwater Street, Shelley, W.A. 6155, Australia

[21] Appl. No.: 285,421

[22] Filed: Dec. 16, 1988

Related U.S. Application Data

[62] Division of Ser. No. 849,707, Apr. 9, 1986, Pat. No. 4,815,545.

[30] Foreign Application Priority Data

Apr. 9, 1985 [AU] Australia .................. PH00063

[51] Int. Cl.⁵ .................. A01B 13/10; A01B 39/16
[52] U.S. Cl. .................. 172/1; 172/657; 172/699; 172/196; 172/413
[58] Field of Search .................. 172/699, 483, 657, 1, 172/700, 484, 196

[56] References Cited

U.S. PATENT DOCUMENTS

| | | | |
|---|---|---|---|
| 3,002,574 | 10/1961 | Padrick | 172/699 |
| 3,024,851 | 3/1962 | Harres | 172/699 |
| 3,120,281 | 2/1964 | Peveler | 172/699 |
| 3,578,090 | 5/1971 | Cline | 172/699 |
| 3,584,692 | 6/1971 | Fasse | 172/699 |
| 4,269,274 | 5/1981 | Robertson | 172/699 |

FOREIGN PATENT DOCUMENTS 2012152 1/1978 United Kingdom .................. 172/672

*Primary Examiner*—Richard J. Johnson
*Attorney, Agent, or Firm*—Cushman, Darby & Cushman

[57] ABSTRACT

A method for fracturing below ground hardpan which includes entering a sub-soil tine beneath the lower surface of a layer of hardpan, with the upper surface angle of the tine in range of orientation which provides an improved fracturing width.

3 Claims, 4 Drawing Sheets

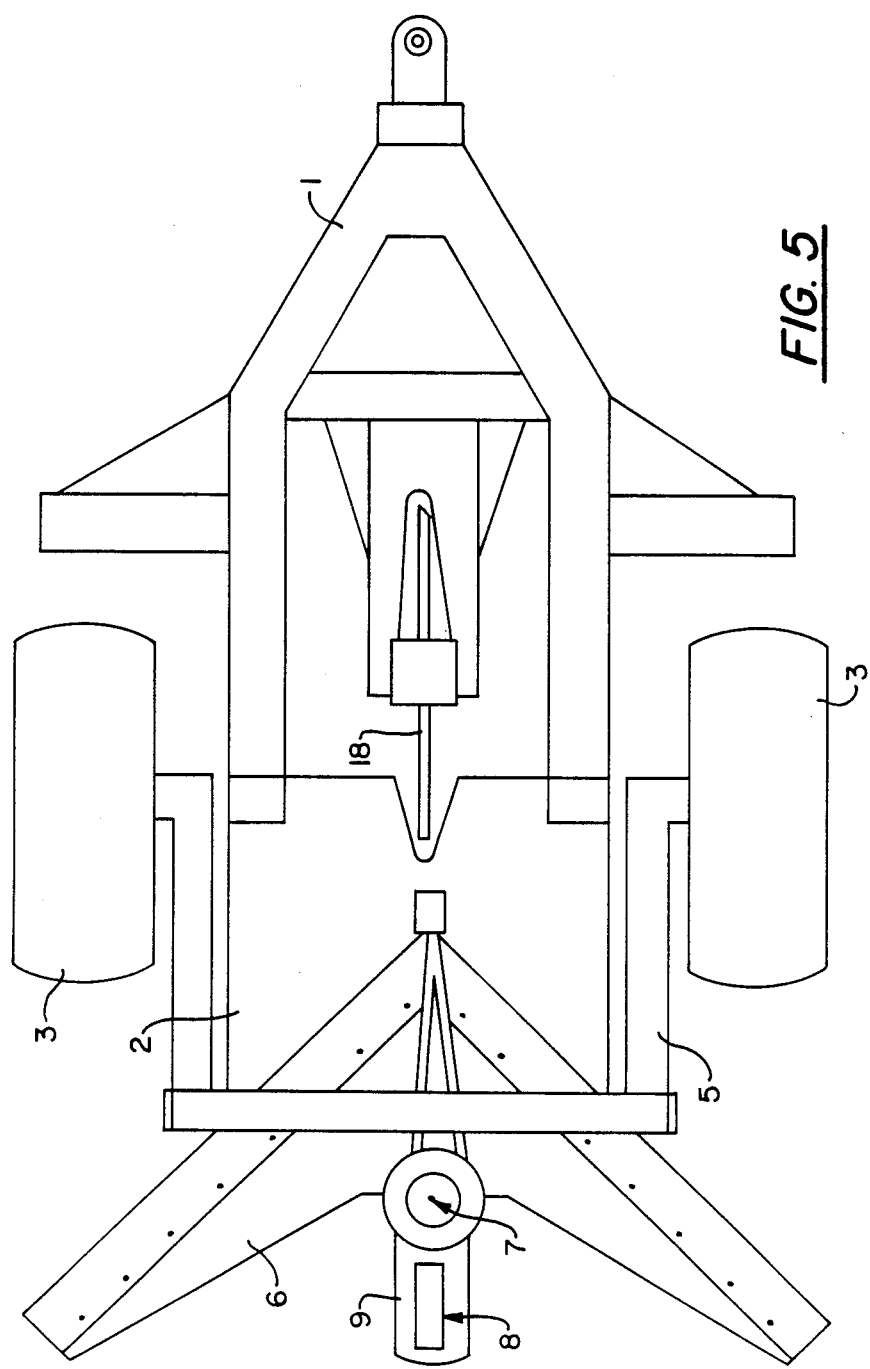

METHOD FOR FRACTURING SUB-SURFACE HARDPAN BY DRAWING A PARTICULARLY-ANGLED TINE THERETHROUGH

This is a division of application Ser. No. 06/849,707, filed Apr. 9, 1986 now U.S. Pat. No. 4,815,545, issued Mar. 28, 1989.

BACKGROUND OF THE INVENTION

This invention relates to a method of treating sub-surface hardpan to improve growing conditions.

In some places in the world, and typically in pine forests in the United States of America, it has been found that a hardpan devleops below the surface of the soil within which the trees are planted.

The causes of such a hard pan have been broadly discussed elsewhere but it is generally acknowledged that the existence of a hardpan of such a type immediately below a growing location of a tree, especially of a type such as a pine tree, can severly inhibit the subsequent growth of that tree.

The hardpan can comprise consolidated clays and can be of such density and structure that a subsequent tree will find significant difficulty, with severe retardation of growth, attempting to push its roots through such a pan.

It is not unknown to try to break this pan by pulling a tine with a sharp end beneath the pan.

The problem hitherto has been that with tynes of previous manufacture and method of control, even though each tine passes through and breaks an immediately localised area of the pan, the effect does not appear to be long-lasting, in that the materials forming the hardpan still remain in the vicinity, and while there is some improvement, the improvement does not last for any extended period of time.

SUMMARY OF THE INVENTION

I have discovered that if a tine working below the pan has an upper face with a different angle of orientation when assessed from front to back as compared to the horizontal supporting ground plane, a quite different effect can be achieved which is of very significant advantage.

Accordingly, the invention can be said to provide a method of treating soil to improve growing conditions, where such soil has extending below it, but within growing range, a hardpan, which method comprises the steps of drawing through such ground a tine. The tine has a forwardmost sharp point, and has, extending rearwardly and being uppermost from the sharp point, an upper surface which is aligned to be within the range of orientation 23 degrees to 33 degrees relative to the horizontal and from a forward to rearward direction and so as to engage with such face the underneath side of the hardpan portion with a lifting and fracturing action.

By preference, such angle of orientation is 28 degrees.

By preference, the width of such upper surface is such as to provide adequate engagement of the hardpan material.

The invention can also be said to reside in the use of apparatus for the treatment of sub-surface hardpan which apparatus includes a tine adapted to be used beneath a hardpan within the ground and to have an upper surface which is aligned to be within the range of orientation 23 degrees to 33 degrees, relative to the horizontal and from a forward to rearward direction where such surface is extending rearwardly and being uppermost from a forwardmost sharp point of the tine.

By preference, such upper surface is orientated at approximately 28 degrees to the horizontal or any supporting plane on the ground, if such plane is other than horizontal.

As the result of such an angle it has been discovered that a significantly greater proportion of the hardpan is found to be lifted with an accompanying fracturing action so that in experiments conducted, a hardpan over a width of approximately three feed is found subsequently to be fractured when a tine according to a preferred embodiment and incorporating the above features is drawn in the manner described through the soil.

Such width of fracturing has been discovered to depend upon such an angle as has been illustrated and the effect appears to be that by the somewhat shallower angle that has been chosen and the very precise angle that is preferred, this appears to more effectively lift a much wider portion of the hardpan so that when fracturing starts to occur all of the material lifted is fractured, hence the much greater width of fracturing achieved.

The significantly greater area that can therefore be achieved for fracturing, from an otherwise extremely narrow tine, provides a very significant economic advantages as well as extremely useful improvement in subsequent growing conditions.

With such broader width of fracturing, it appears that reconstitution of the hardpan by the naturally occurring factors, is much more difficult and plants subsequently growing can pass through the hardpan area in a multitude of different locations.

BRIEF DESCRIPTION OF THE DRAWINGS

For a better understanding of this invention it will now be described with the assistance of drawings in which:

FIG. 5 is a top plan view of the apparatus.

DETAILED DESCRIPTION

Figure 1:
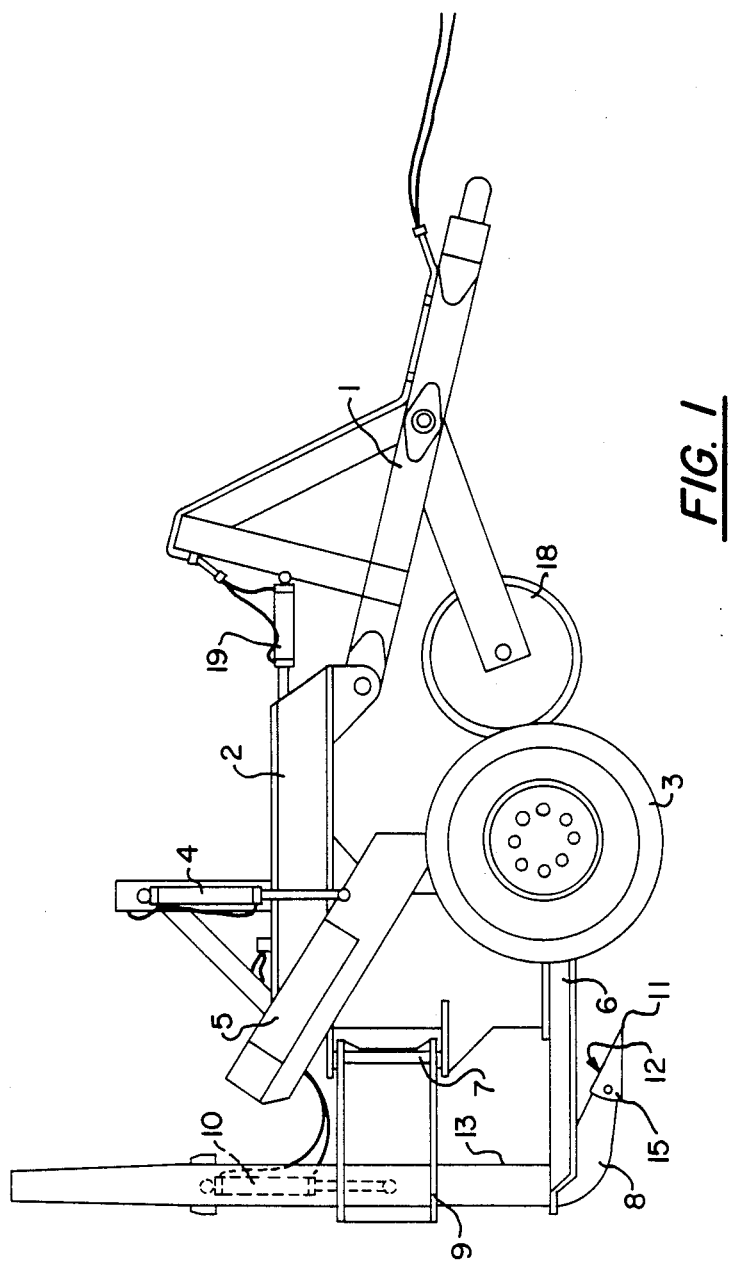
FIG. 1 is a side elevation of an apparatus according to a first embodiment.
Figure 2:
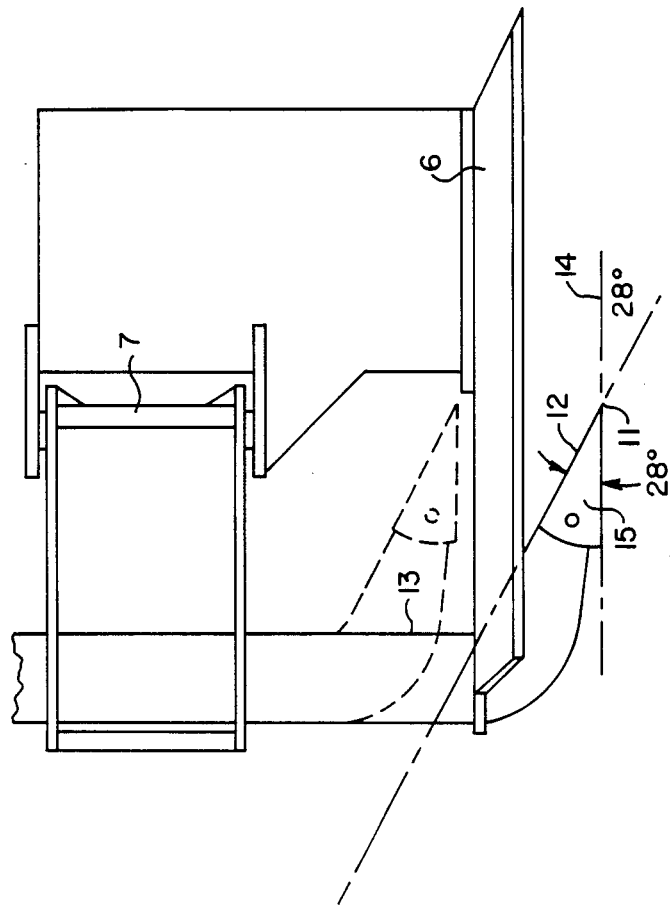
FIG. 2 is a side elevation of a portion of the apparatus showing, in particular, detail of the sub-soiling tine.

Referring in detail to the drawings, the embodiment includes a draft frame 1 which is coupled to a main frame 2 which, in turn, is supported by ground-engaging wheels 3 which are governed in relative height by control hydraulic ram 4 operating through pivotally supported frame 5.

The main frame 2 supports a blade plough 6.

Supported behind the blade plough 6, and such that it can rotate about a vertical pivot axis at 7, is a tine 8.

The tine 8 is supported by sub-frame 9 and is controlled in height, relative to the ground, by hydraulic ram 10 acting cooperatively relative to main frame 2 and ground-engaging wheels 3.

The tine 8 has a forwardmost sharp end at 11 and has, secured over a front portion, a separate nose which is made of hardened metal, to provide long wearing characteristics.

Of importance is the angular relationship of the upper surface 12 of this front nose, the upper surface 12 being of a consistent width from the front sharp edge 11 to the front vertical edge 13.

This upper surface 12 is of planar alignment and is substantially linear when measured from the front edge 11 to the start of a curved portion entering into the front vertical edge 13.

The orientation of this upper surface 12 relative to the supporting ground plane, which is conventionally horizontal, and referred to as alignment 14, has an angle of 28 degrees, as at 15.

The alignment of the axis of the pivot support at 7 is such that it substantially coincides with the position of the front sharp end 11, with the effect that, when the apparatus is pulled through the soil, the tine will tend to follow in its pointing direction, a direction to travel.

Of importance, however, is the operation of this angle of orientation in the soil.

Figure 3:
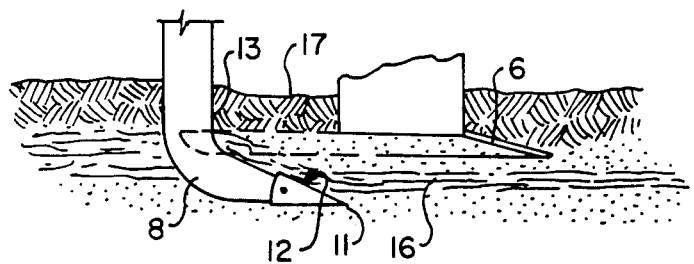
FIG. 3 is a side elevation of a portion of the apparatus when within the soil and in a digging situation with a hardpan.

By way of illustration, FIG. 3 illustrates the way in which the sub-soiling tine 8 is to be held just below a hardpan 16 so that as the hardpan reaches the upper surface 12, the hardpan will be lifted somewhat gently, but to such an extent before significant fracturing occurs, so that, when fracturing does occur, the width of fracturing is exceedingly extended, and, as has been indicated, such width can extend to approximately a total of three feet.

Figure 4:
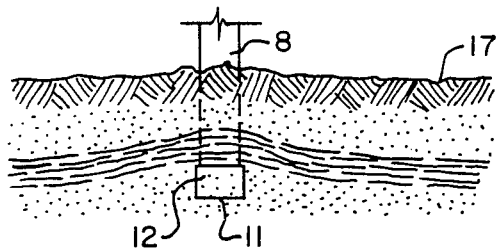
FIG. 4 is a view, once again in cross-section, through the ground from the front of the sub-soiling tine illustrating the hardpan fracturing effect.

FIG. 4 shows this, perhaps more graphically, where the dramatic effect of lift in this way can be more easily seen. Here, again, the tyne 8 operates to lift the hardpan 16 which is somewhat below the uppermost ground level.

It has been found that while 28 degrees orientation is ideal, the advantage can be obtained within a wider range.

The method of operation is to pull such a tine with the upper surface disposed so that, as compared to the alignment of the hardpan, the lifting angle from forward to rearward is this 28 degrees relative to a ground support, which would conventionally be the horizontal alignment of the supporting ground plane.

In conjunction with such a sub-soiling tine there is significant advantage in providing accompanying cutting of roots using a blade plough, and insofar that a lot of debrise will often be on the surface, a cutting coulter 18 is included, as shown in FIG. 1. The position of the coulter is governed by the relative position of frames 1 and 2, which is controlled by operation of hydraulic ram 19.

I claim:

1. A method for lifting an fracturing a sub-surface stratum of hardpan having a level of upper extent and a level of lower extent, in soil having a supporting, upwardly facing ground plane, comprising:
    (a) providing a tine comprising:
        a generally vertical support member having provided on a lower end thereof a tine body which projects forwards and downwards from said support member;
        said tine body having an upper surface and a lower surface which converge to a forwardly projecting point;
        said support member above and leading down to said tine body having a substantially vertical front edge;
        said upper surface of said tine body being substantially planar and extending obliquely rearwardly and upwardly from said forwardly projecting point to said vertical front edge of said support member;
        said upper surface of said tine body being disposed at an angle of orientation within the range of 23 to 33 degrees relative to said ground plane;
        said upper surface of said tine body being of a substantially constant width from said forwardly projecting point to said vertical front edge of said support member;
    (b) adjacent said sub-surface stratum of hardpan, inserting said tine body downwardly into the soil on said support member so that said forwardly projecting point is disposed in the soil at a level of insertion below said stratum of hardpan and is directed towards said stratum of hardpan, but said upper surface of said tine body at said vertical front edge of said support member is disposed at a level which is above the lower extent of said stratum of hardpan; and
    (c) while maintaining said tine body disposed with said point at said level of insertion, and, while maintaining said angle of orientation of said upper surface of said tine body relative to said ground plane, drawing said tine forwards along a path generally parallel to said ground plane, towards and disruptively into said stratus of hardpan, thereby lifting and fracturing said stratum of hardpan throughout a region which is substantially broader than said upper surface of said tine body;
    said stratum of hardpan being one which was created by growth of a pine tree in said soil; and
    in conducting step (c), said stratum being broken sufficiently in a plurality of locations as to permit roots of said pine tree to grow through said locations.

2. The method of claim 1, wherein:
while conducting step (c), said angle of orientation is maintained at approximately 28 degrees to said ground plane.

3. The method of claim 1, wherein:
as part of step (a), said support member is supported, on a ground-engaging, ground plane-traversing device, for rotation about a substantially vertical axis which approximately coincides with said forwardly projecting point of said tine body; and
as part of step (c), said tine is permitted to freely rotate about said substantially vertical axis.

* * * * *